US006561523B1

(12) United States Patent
Wienhold

(10) Patent No.: US 6,561,523 B1
(45) Date of Patent: May 13, 2003

(54) AUTOMATIC TOOL-BIT HOLDER

(76) Inventor: James L. Wienhold, 3336 Idaho Ave. South, Minneapolis, MN (US) 55426

(*) Notice: Subject to any disclaimer, the term of this patent is extended or adjusted under 35 U.S.C. 154(b) by 150 days.

(21) Appl. No.: 09/714,592

(22) Filed: Nov. 16, 2000

Related U.S. Application Data

(60) Provisional application No. 60/225,350, filed on Aug. 15, 2000, and provisional application No. 60/166,281, filed on Nov. 18, 1999.

(51) Int. Cl.[7] .......... B23B 31/107

(52) U.S. Cl. .......... 279/30; 279/75; 279/905

(58) Field of Search .......... 279/22, 30, 75, 279/905, 906; 403/322.2, DIG. 6; 81/438, 439; 433/128

(56) References Cited

U.S. PATENT DOCUMENTS

| | | | | |
|---|---|---|---|---|
| 81,260 A | | 8/1868 | Davis | |
| 87,715 A | | 3/1869 | Sible | |
| 1,031,914 A | | 7/1912 | Clouse | |
| 1,602,708 A | | 10/1926 | Russell | |
| 2,350,565 A | | 6/1944 | Mills | 279/76 |
| 2,370,487 A | | 2/1945 | Poutie | 279/42 |
| 2,405,772 A | * | 8/1946 | Adams et al. | 279/22 |
| 2,736,562 A | | 2/1956 | Blackburn | 279/76 |
| 2,767,992 A | | 10/1956 | Emrick | 279/82 |
| 2,807,473 A | | 9/1957 | Kiehne | 279/82 |
| 2,926,020 A | | 2/1960 | Dayton et al. | 279/75 |
| 2,965,382 A | | 12/1960 | Schlage | 279/77 |
| 2,987,334 A | | 6/1961 | Wendling | 287/119 |
| 3,039,781 A | * | 6/1962 | Bilz | 279/75 |
| 3,216,471 A | | 11/1965 | Wendel | 145/61 |
| 3,220,743 A | | 11/1965 | Knapp | 279/28 |
| 3,255,792 A | | 6/1966 | Beck | 145/64 |
| 3,367,727 A | | 2/1968 | Ward et al. | 306/28 |
| 3,398,965 A | * | 8/1968 | Cox | 279/30 |
| 3,521,895 A | * | 7/1970 | Smith | 279/22 |

(List continued on next page.)

FOREIGN PATENT DOCUMENTS

| | | | |
|---|---|---|---|
| DE | 1 552 404 | 12/1969 | 408/238 |

OTHER PUBLICATIONS

Brochure entitled "Insty–Bit Patented Quick Change System," 1993/1994, by Wienhold Associates, Minneapolis, MN 55426.

Brochure entitled "Insty–Bit® Quick–Change Drilling System," 1991–1993, by Wienhold Associates, Minneapolis, MN 55426.

Brochure entitled "Insty–Bit® Patented Quick–Change System," 1994, by Insty–Bit, Inc., Minneapolis, MN 55405.

(List continued on next page.)

*Primary Examiner*—Steven C. Bishop
(74) *Attorney, Agent, or Firm*—Kinney & Lange, P.A.

(57) ABSTRACT

A tool-bit holder for receiving a tool-bit that automatically captures the tool-bit as it is inserted into the holder with a quick release mechanism to prevent axial withdrawal of the tool-bit from the holder. The tool-bit includes a shank portion with a circumferential groove. The tool-bit holder also includes a hub having a longitudinal bore for receiving the shank and a radial bore partially housing a detent ball used to capture the tool-bit shank at its circumferential groove within the tool-bit holder. A sleeve is axially slidably mounted relative to the hub and has a radial bore in communication with the radial bore of the hub for reception of the detent ball. The sleeve is axially biased by a spring and forces the detent ball against and along an inner ramp face fixed relative to the hub. The inner ramp face forces the detent ball radially inwardly and through the radial bore to seat in the circumferential groove of the tool-bit shank. Attempted axial extraction of the tool-bit from the longitudinal bore without releasing the detent ball locks the ball against the inner ramp face and prevents extraction of the tool-bit. The tool-bit is released when the bias force of the spring is relieved or countered by axially sliding the sleeve relative to the hub, so that the tool-bit can then be withdrawn from the hub.

24 Claims, 11 Drawing Sheets

U.S. PATENT DOCUMENTS

| | | | | | |
|---|---|---|---|---|---|
| 3,558,146 | A | | 1/1971 | Mayers et al. | 279/28 |
| 3,583,715 | A | | 6/1971 | Jahrl | 279/75 |
| 3,672,692 | A | | 6/1972 | Fauth | 279/82 |
| 3,756,737 | A | | 9/1973 | Smith | 408/239 |
| 3,758,222 | A | | 9/1973 | Oakes | 408/224 |
| 3,932,904 | A | | 1/1976 | Nilsson et al. | 7/14.1 R |
| 3,937,119 | A | | 2/1976 | Ernst | 85/47 |
| 3,945,653 | A | | 3/1976 | Falchle | 279/97 |
| 3,965,510 | A | | 6/1976 | Ernst | 7/14.1 R |
| 4,184,692 | A | | 1/1980 | Benson et al. | 279/75 |
| 4,209,182 | A | | 6/1980 | Sheldon | 279/75 |
| 4,210,215 | A | | 7/1980 | Peetz et al. | 175/394 |
| D257,511 | S | | 11/1980 | Zahn | D15/139 |
| 4,290,617 | A | | 9/1981 | Yoshida | 279/75 |
| 4,381,116 | A | | 4/1983 | Futter | 279/62 |
| 4,413,937 | A | | 11/1983 | Gutsche | 408/239 |
| 4,434,859 | A | | 3/1984 | Rumpp et al. | 173/48 |
| RE31,755 | E | | 12/1984 | Wanner et al. | 464/167 |
| 4,514,117 | A | | 4/1985 | Scott | 408/239 |
| 4,577,875 | A | | 3/1986 | Miyakawa | 279/75 |
| 4,582,458 | A | | 4/1986 | Korb et al. | 408/224 |
| 4,588,335 | A | | 5/1986 | Pearson, Jr. | 408/239 |
| 4,594,036 | A | | 6/1986 | Hogenhout | 408/240 |
| 4,629,375 | A | | 12/1986 | Lieser | 408/239 |
| 4,692,073 | A | | 9/1987 | Martindell | 408/239 |
| 4,708,548 | A | | 11/1987 | Taylor et al. | 409/234 |
| 4,710,079 | A | | 12/1987 | Smith et al. | 409/234 |
| 4,711,457 | A | | 12/1987 | Wezel | 279/65 |
| 4,789,276 | A | | 12/1988 | Clarke | 408/230 |
| 4,858,939 | A | | 8/1989 | Riggs | 279/75 |
| 4,900,202 | A | | 2/1990 | Wienhold | 408/240 |
| 4,990,038 | A | | 2/1991 | DeLong | 408/127 |
| 5,013,194 | A | | 5/1991 | Wienhold | 408/240 |
| D347,848 | S | | 6/1994 | Maynard, Jr. | D15/139 |
| 5,387,059 | A | | 2/1995 | Borzemsky | 408/226 |
| 5,417,527 | A | | 5/1995 | Wienhold | 408/239 |
| 5,464,229 | A | * | 11/1995 | Salpaka | 279/30 |
| 5,466,100 | A | | 11/1995 | Ahluwalia | 408/224 |
| D390,239 | S | | 2/1998 | Malin | D15/139 |
| 5,722,805 | A | | 3/1998 | Griffin | 408/239 |
| 5,782,636 | A | | 7/1998 | Armstrong et al. | 433/165 |
| 5,797,711 | A | | 8/1998 | Mulgrave et al. | 408/226 |
| D408,424 | S | | 4/1999 | Schmotzer | D15/139 |
| D419,575 | S | | 1/2000 | Kouvelis | D15/139 |
| 6,059,296 | A | * | 5/2000 | Baeder | 279/22 |
| 6,135,462 | A | | 10/2000 | Robison | 279/137 |

OTHER PUBLICATIONS

Article entitled "Faster, Better Drilling for Finish Carpenters," *Fine Homebuilding*, by Bruce Greenlaw, Feb./Mar. 1996.

Declaration of James L. Wienhold Regarding Stanley® Drill Chuck purchased Aug. 28, 2000.

* cited by examiner

AUTOMATIC TOOL-BIT HOLDER

CROSS-REFERENCE TO RELATED APPLICATION(S)

This application claims priority from provisional application No. 60/166,281 filed Nov. 18, 1999 for "Self-Locking Chuck Mechanism" by James L. Wienhold and from provisional application No. 60/225,350 filed Aug. 15, 2000 for "Self-Locking Chuck Mechanism" by James L. Wienhold.

BACKGROUND OF THE INVENTION

The present invention generally relates to tool-bit holders. Specifically, the present invention relates to a tool-bit holder that automatically captures tool-bits as they are inserted into the holder.

In many situations, an operator must frequently change tools while working on a particular project. Often the operator is in a position where quickly exchanging one tool-bit for another is awkward. In order to change tool-bits held within existing tool-bit holders, an operator must manipulate a tool-bit locking mechanism. For example, to change tools held by a conventional three-jaw chuck, the operator must loosen the jaws to remove or insert a tool-bit, and tighten the jaws to secure a tool-bit. This usually requires the operator to use both hands to perform an exchange. Because of the awkwardness inherent in exchanging tools in such tool-bit holders, the operator's work is slowed.

In some situations an operator may not be able to access the securing or releasing mechanism of the tool-bit holder. For example, such mechanisms are inserted into a handle, such as a screw driver handle, such that to directly activate a sleeve or other mechanism for securing or releasing the tool-bit may be impossible. These situations require that a tool-bit be automatically secured or released by the tool-bit holder as the tool-bit is inserted or pulled out of the tool-bit holder.

Several devices have been designed to reduce the awkwardness inherent in exchanging tools in a tool-bit holder. However, all require some degree of manipulation of the tool-bit holder to secure and release a tool-bit shank. As a result, an automatic tool-bit holder in which a tool-bit shank may be inserted and secured without additional manipulation of a locking or releasing device would be highly desirable.

BRIEF SUMMARY OF THE INVENTION

The invention is a tool-bit holder for a tool-bit that automatically captures a shank of the tool-bit as the shank is inserted into the holder and prevents axial retraction of the tool-bit while the holder is in a locking position.

The automatic tool-bit holder of the present invention includes a hub having a longitudinal bore for inserting and capturing the shank. The hub includes a radial bore through which a detent ball may intrude into the longitudinal bore and seat into a circumferential groove in the shank of the tool-bit. The radial bore has a width smaller than the diameter of the detent ball to prevent the detent ball from falling radially into the longitudinal bore of the hub.

A spring or the like, axially biases a sleeve to force the detent ball in contact with an inner ramp face. Preferably, sleeve lies at least partially within a fixed collar disposed annularly about the hub. As the detent ball is forced into contact with the inner ramp face, the detent ball is directed radially inwardly along the inner ramp face and through the radial bore into the hub to contact the shank, and ultimately to seat in the groove to capture the tool-bit. The tool-bit is released when the bias force is relieved or countered, by axially sliding the sleeve relative to the hub.

In one alternative embodiment of the present invention, the sleeve is slidable within the longitudinal bore, eliminating the need for a fixed collar. The sleeve has an opening axially aligned with the radial bore to carry the detent ball. A compressed spring disposed between the sleeve and a closed end of the longitudinal bore provides the axial bias force pressing the detent ball in contact with an inner ramp face of the radial bore. As the detent ball is forced into contact with the inner ramp face, the detent ball is directed radially inwardly along the inner ramp face and through the opening in the sleeve to contact the shank, and ultimately to seat in the groove to capture the tool-bit. The tool-bit is released when the bias force is relieved or countered, by axially sliding the sleeve relative to the hub.

The present invention may also be defined in relation to a tool-bit holder of the type which has a hub a detent ball, a sleeve and a spring. The hub has a longitudinal bore formed for axially receiving a tool-bit shank therein, such that the longitudinal bore has an open end and a terminating face. The hub also has a radial bore therethrough. The detent ball is radially movably disposed in the radial bore of the hub for selected engagement with a circumferential groove on the tool-bit shank. The sleeve is axially slidably mounted relative to the hub or engaging the detent ball and the spring biases the sleeve into engagement with the detent ball. The present invention includes a radial bore in the sleeve that communicates with the radial bore of the hub for receiving the detent ball. In addition, the invention includes a longitudinally extending inner ramp face that is fixed relative to the hub for engaging the detent ball. The inner ramp face is opposed to the bias of the spring such that the inner ramp face extends radially outwardly toward the terminating face of the longitudinal bore.

While the above-identified drawing figures set forth two preferred embodiments of the invention, this disclosure is intended to present the invention by way of representation and not limitation. It should be understood that numerous other modifications and embodiments can be devised by those skilled in the art which follow the scope and spirit of the principles of this invention.

DETAILED DESCRIPTION

Figure 1:
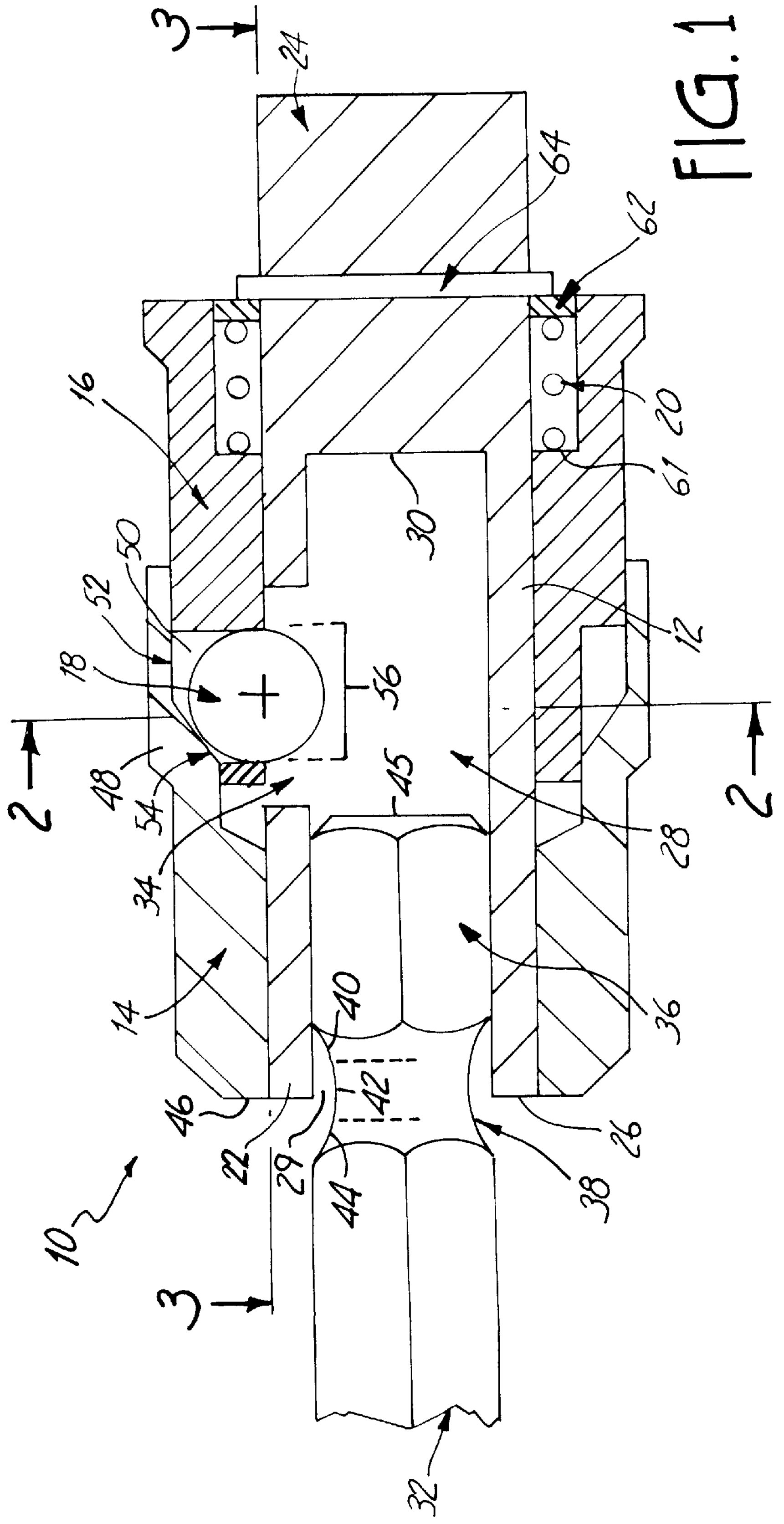
FIG. 1 is a sectional view of a tool-bit shank prior to full insertion into a first embodiment of an automatic tool-bit holder of the present invention, with the tool-bit holder in an unloading position.

The present invention is a tool-bit holder for automatically capturing and retaining a tool-bit. A first embodiment of an automatic tool-bit holder is shown in FIG. 1. The tool-bit holder 10 includes a hub 12, a collar 14, a sleeve 16, a detent ball 18 and a spring 20.

The hub 12 has a forward distal end 22, ending in a forward face 26, and a rear proximal end 24. Preferably, the proximal end 24 of the hub 12 is shaped to provide a connection to a chuck for a power tool. Alternatively, the proximal end 24 provides a connection to other devices such as tools used for drilling and driving. The proximal end 24 typically has a hexagonally-shaped cross-section. A longitudinal bore 28, preferably hexagonally-shaped, extends perpendicularly into the forward face 26 and axially toward the proximal end 24 of the hub 12. The longitudinal bore 28 has an open end 29 and terminates in the hub 12 at a terminating face 30. The longitudinal bore 28 is substantially aligned along the longitudinal axis of the hub 12 and is shaped to admit the shank of a standard quick release tool-bit 32. Preferably, the terminating face 30 is substantially perpendicular to the longitudinal axis of the hub 12, although a person skilled in the art would realize that the terminating face 30 may have a concavity due to the boring process. The hub 12 has a radial bore 34 located along the longitudinal axis of the hub 12 and the radial bore 34 is preferably aligned to extend substantially perpendicular to the longitudinal axis of the hub 12. The radial bore 34 extends completely through the hub 12 such that the radial bore 34 communicates with the longitudinal bore 28.

As is typical, the tool-bit 32 includes a hexagonally-shaped shank 36. The shank 36 includes a circumferential groove 38 near the rear end of the shank 36. The circumferential groove 38 includes three distinct profiles, including a radially inwardly extending rear radiused shoulder 40, a centered flat portion 42 and a radially inwardly extending forward radiused shoulder 44. The shank 36 has a rear face 45. When the shank 36 is completely admitted in the hub 12, the rear face 45 of the shank 36 rests against the terminating face 30 of the longitudinal bore 28.

The collar 14 is fixedly attached to the hub 12 forward of the radial bore 34 adjacent the open end 29 of the longitudinal bore 28 and is disposed annularly about the hub 12. The collar 14 has a forward face 46 at the distal end 22 of hub 12 extending radially outwardly from the longitudinal axis of the hub 12 and preferably forms one continuous plane with the forward face 26 of the hub 12. The collar 14 also has a proximal end 48. The proximal end 48 is preferably ramped up from the collar 14 (radially away and rearwardly), although a person skilled in the art would realize that the proximal end 48 could be stepped up (out and away) from the collar 14 as well. The proximal end 48 of the collar 14 forms a channel 50 that lies substantially proximate to the radial bore 34 of the hub 12. The proximal end 48 has a longitudinal face 52 forming one wall of the channel 50 and an inner ramp face 54 forming another wall of the channel 50. The inner ramp face 54 preferably extends radially outwardly and axially rearwardly from the longitudinal axis of the hub 12. A person skilled in the art would realize that additional faces may be used to form the walls of the channel 50 and that such faces may have various angular orientations.

The sleeve 16 is slidably mounted along the hub 12 substantially rearward of the radial bore 34. The sleeve 16 is disposed annularly about the hub 12. Preferably the sleeve 16 is keyed to the hub 12 due to the detent ball 18 to prevent relative rotation between the hub 12 and the sleeve 16. An optional external outer sleeve may be installed over sleeve 16 to allow free rotation of an operator grasping area relative to hub 12. The sleeve 16 lies at least partially within the channel 50 of the collar 16 such that the sleeve 16 axially slides along the hub 12 and within the channel 50. The sleeve 16 has a radial bore 56 in communication with the radial bore 34 of the hub 12.

Figure 3:
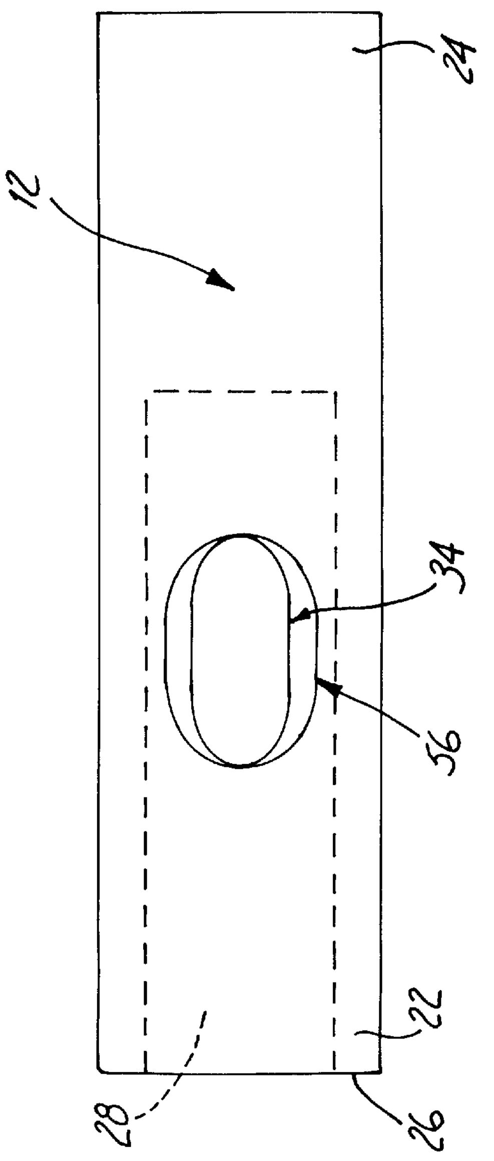
FIG. 3 is a plan view of the hub of the automatic tool-bit holder of the first embodiment, as seen along the plane defined by lines 3—3 in FIG. 1.
Figure 2:
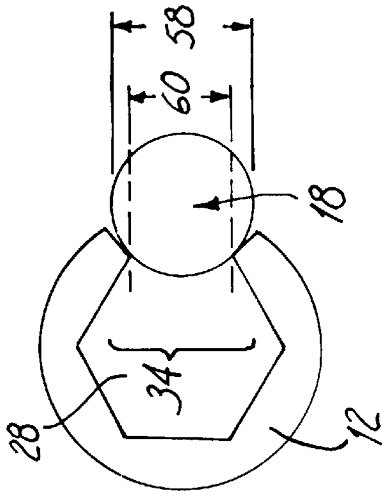
FIG. 2 is a sectional view as taken along lines 2—2 in FIG. 1, showing only the hub and detent ball of the tool-bit holder of the first embodiment.

The detent ball 18 is disposed within the radial bore 56 of the sleeve 16 and the radial bore 34 of the hub 12, which are circumferentially aligned. The longitudinal face 52 on the proximal end 48 of the collar 14 prevents the detent ball 18 from leaving its position within the channel. 50 and completely falling radially out of the tool-bit holder 10. As can be seen by FIG. 2, the diameter 58 of the detent ball 18 is greater than the width 60 of the radial bore 34 of the hub 12 (at its radially inner end), thereby preventing the detent ball 18 from completely falling radially into the longitudinal bore 28. FIG. 3 is a plan view of the hub 12, and also illustrates the location of the radial bore 56 of the sleeve 16 relative to the radial bore 34 of the hub 12. The radial bore 56 of the sleeve 16 is circular and the radial bore 34 of the hub 12 is elongated longitudinally.

The spring 20 is disposed between a shoulder 61 of the sleeve 16 and a washer 62. The spring 20 is of the compression spring type, such that the spring 20 biases the sleeve 16 axially toward the open end 29 of the longitudinal bore 28. A retaining clip 64 prevents the washer 62 from moving toward the proximal end 24 of the hub 12. When the sleeve 16 is urged towards the open end 29 of the longitudinal bore 28, the detent ball 18 in the radial bore 56 of the sleeve 16 opposes the bias of the spring 20 and engages the inner ramp face 54. The inner ramp face 54 extends radially outwardly and toward the terminating face 30 of the longitudinal bore 28. The sleeve 16 is slidably positionable along the hub 12 between a locking position and a retracting position (or a tool-bit loading position and unloading position). When the sleeve 16 is in the locking position (FIG. 5), the spring 20 is less compressed than when the sleeve 16 is in the retracting position (FIG. 6), and when the sleeve 16 is in the loading position (FIG. 4), the spring 20 is less compressed than when the sleeve 16 is in the unloading position (FIG. 1).

Figure 4:
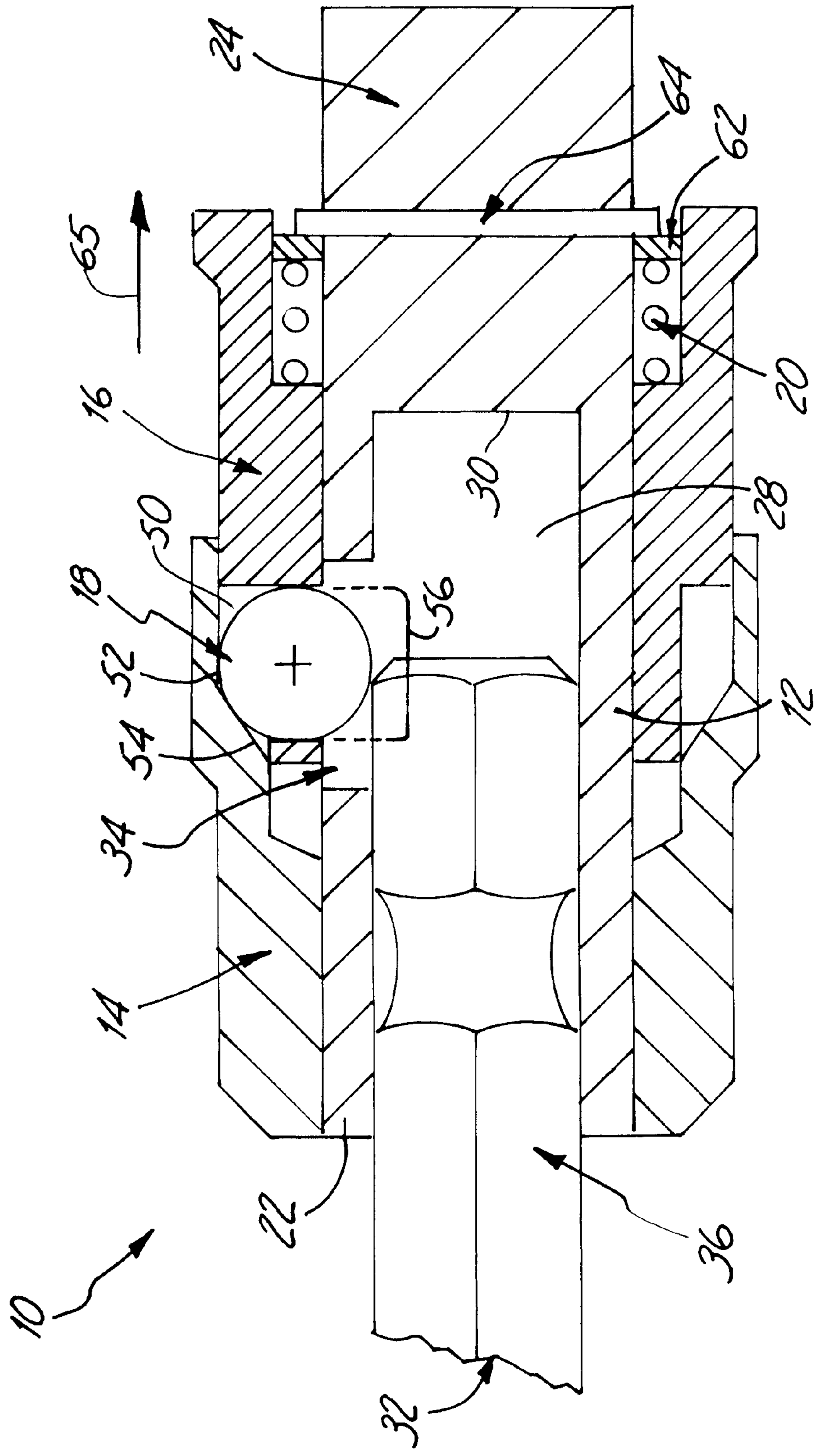
FIG. 4 is a sectional view of the tool-bit shank being inserted or released from the first embodiment of the tool-bit holder, with the tool-bit holder in a loading position.

FIG. 1 illustrates a sectional view of the tool-bit holder 10 while it is in the unloading position prior to full insertion of tool-bit shank 36 into the longitudinal bore 28. The tool-bit holder 10 stays in the unloading position until the shank 36 comes in contact with the detent ball 18 as it enters the longitudinal bore 28 (as shown in FIG. 4). While the tool-bit holder 10 is in the unloading position, the spring 20 urges the sleeve 16 axially towards the distal end 22 of the hub 12. The detent ball 18 rides along with the sleeve 16 in the radial bores 34, 56. The detent ball 18 is urged radially inwardly along the inner ramp face 54 until it can go no further and stops the sleeve 16 from further axially forward movement along the hub 12. The detent ball 18 is prevented from completely falling radially into the longitudinal bore 28 by the radial bore 34 of the hub 12 (as can be seen in FIG. 2) because the diameter 58 of the detent ball 18 is greater than the width 60 of the radial bore 34 (at its radially innermost end).

FIG. 4 illustrates a sectional view of the tool-bit holder 10 in the loading position as the shank 36 of the tool-bit 32 is directed through the longitudinal bore 28 towards the terminating face 30. The shank 36 comes in contact with the detent ball 18 and urges the detent ball 18 radially outwardly against the inner ramp face 54. This in turn forces the sleeve 16 to slide axially rearward (in direction of arrow 65) towards the proximal end 24 of the hub 12, at least until the detent ball 18 contacts the radial bore 34. The detent ball 18 rides in the radial bore 56 of the sleeve 16 along the shank 36 (the radial bore 56 is circular, as seen in FIG. 3). The spring 20 compresses as the sleeve 16 slides axially rearward toward the proximal end 24.

Figure 5:
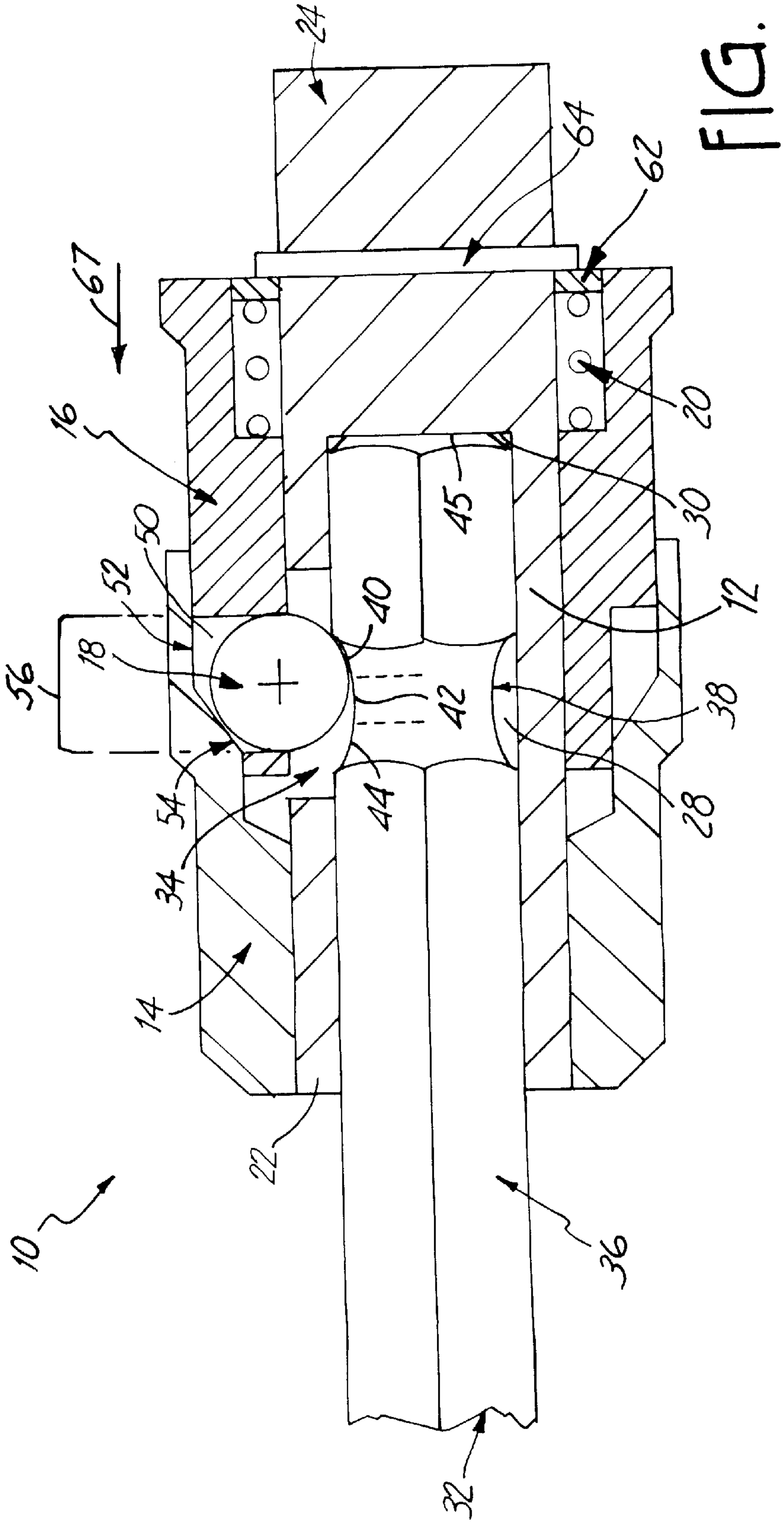
FIG. 5 is a sectional view of the tool-bit shank being captured by the tool-bit holder of the first embodiment, with the tool-bit holder in a locking position.

FIG. 5 shows a sectional view of the tool-bit holder 10 in the locking position. As the shank 36 of the tool-bit 32 moves into the longitudinal bore 28, the circumferential groove 38 of the shank 36 becomes axially aligned with the radial bore 34 of the hub 12 and the detent ball 18. The shank 36 stops its progression into the longitudinal bore 28 when the rear face 45 of the shank 36 contacts the terminating face 30 of the longitudinal bore 28. When the circumferential groove 38 is axially aligned with the detent ball 18, the detent ball 18 can no longer ride along the shank 36 and the spring 20 urges the sleeve 16 axially forward (in direction of arrow 67) along the hub 12 towards the distal end 22 of the hub 12. The axially forward movement of the sleeve 16 forces the detent ball 18 (riding in the radial bore 56 of the sleeve 16) radially inwardly along the inner ramp face 54 of the collar 14. The inner ramp face 54 urges the detent ball 18 radially inwardly through the radial bore 34 of the hub 12 and forces the detent ball 18 to seat in the circumferential groove 38 of the shank 36. The detent ball 18 sits on the radially, inwardly extending rear radiused shoulder 40 of the circumferential groove 38. The spring 20 urges the sleeve 16 axially forward towards the distal end 22 of the hub 12 (in direction of arrow 67). The detent ball 18 is stopped by the inner ramp face 54 of the collar 14 such that the sleeve 16 is prevented from moving axially forward along the hub 12 beyond the locking position (FIG. 5).

In the locking position, the tool-bit 32 is locked into the tool-bit holder 10 and cannot be pulled from the tool-bit holder 10. When an attempt to remove the tool-bit 32 from the hub 12 is made by pulling the shank 36 along its longitudinal axis towards the distal end 22 of the hub 12, the rear radiused shoulder 40 of the circumferential groove 38 forces the detent ball 18 against the inner ramp face 54 of the collar 14. The inner ramp face 54 prevents the detent ball 18 from radially outwardly moving out of the circumferential groove 38. The detent ball 18 remains seated in the circumferential groove 38 and does not allow the shank 36 to be removed from the longitudinal bore 28.

Figure 6:
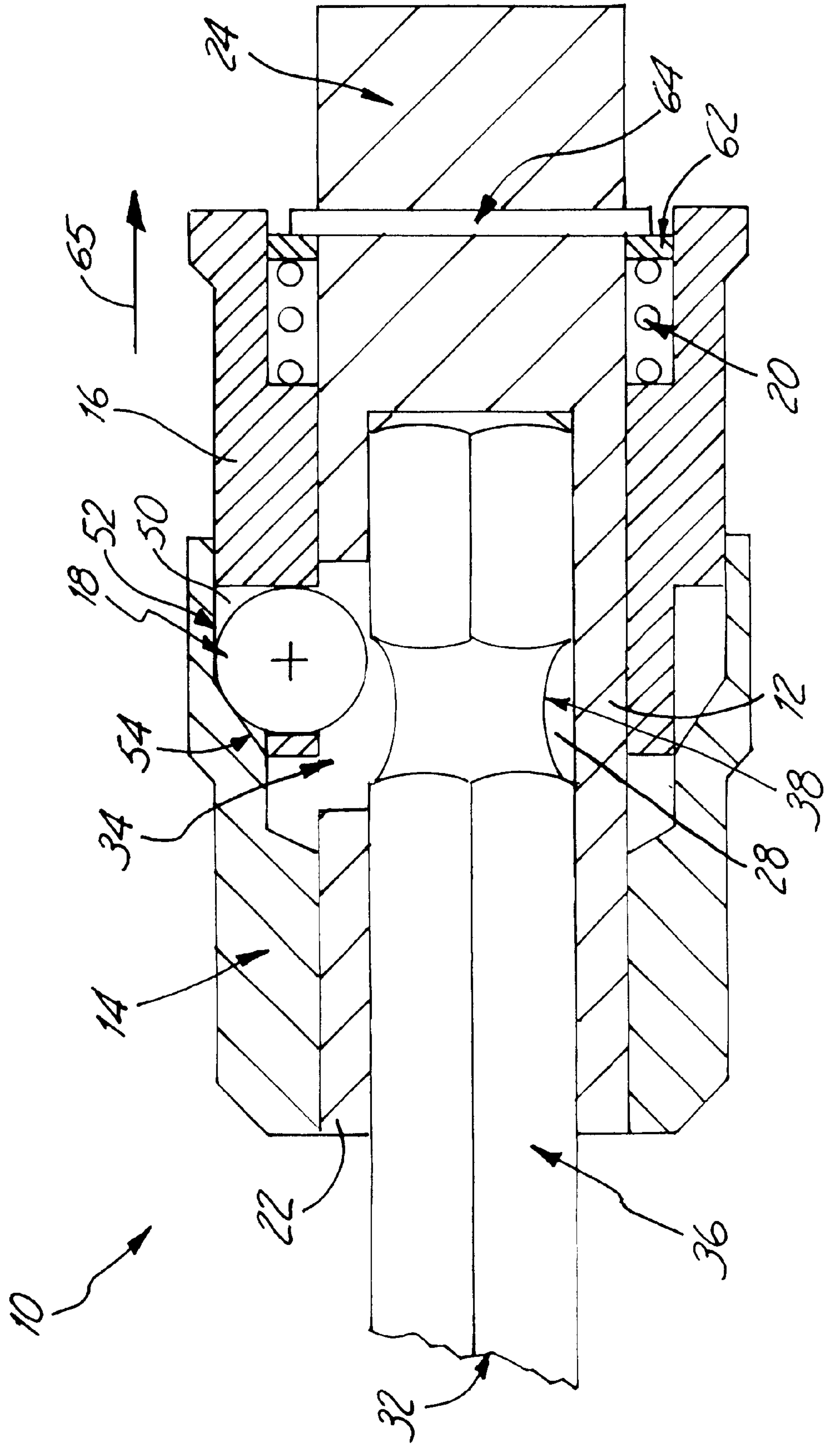
FIG. 6 is a sectional view of the tool-bit shank being released from the tool-bit holder of the first embodiment, with the tool-bit holder in a retracting position.

FIG. 6 shows a sectional view of the tool-bit holder 10 with the sleeve 16 in the retracting position, thereby allowing removal of the tool-bit 32 from the longitudinal bore 28. The sleeve 16 is moved axially rearwardly (in direction of arrow 65) along the hub 12 toward the proximal end 24 of the hub 12 and against the bias force of the spring 20, thereby compressing the spring 20. Movement of the sleeve 16 is generally performed by the tool operator. As the sleeve 16 is moved axially rearwardly along the hub 12, the detent ball 18 riding in the radial bore 56 of the sleeve 16 is urged radially outwardly along the inner ramp face 54, removing the detent ball 18 from its seat in the circumferential groove 38. Once the detent ball 18 is removed from the circumferential groove 38, the shank 36 of the tool-bit 32 is free to be released from the longitudinal bore 28. The tool-bit 32 is removed by pulling the shank 36 longitudinally toward the distal end 22 of the hub 12, thereby releasing the tool-bit 32 from the tool-bit holder 10.

A second embodiment of an inventive automatic tool-bit holder 70 is shown in FIGS. 7–12. The second embodiment is particularly adapted to be inserted into a tool handle 72, such as a screwdriver handle. When inserted into the handle 72 a large portion of the tool-bit holder 70 is inaccessible, requiring a tool-bit catch and release mechanism that operates with limited access. The tool-bit holder 70 includes a hub 74, a sleeve 76, a detent ball 78 and a spring 80.

The hub 74 has a forward distal end 82 and a rear proximal end 84. The distal end 82 ends in a forward face 86 that is generally perpendicular to the longitudinal axis of the hub 74. A longitudinal bore 88, preferably cylindrically shaped but alternatively hexagonally-shaped, extends perpendicularly into the forward face 86 and axially toward the proximal end 84 of the hub, 74. The longitudinal bore 88 has an open end 89 and terminates in the hub 74 at a terminating face 90. The longitudinal bore 88 is substantially aligned along the longitudinal axis of the hub 74 and is shaped to admit a standard quick release tool-bit 92. Preferably, the terminating face 90 is substantially perpendicular to the longitudinal axis of the hub 74, although a person skilled in the art would realize the terminating face 90 may have a concavity due to the boring process.

The hub 74 has a radial bore 94 preferably extending radially outwardly and axially rearwardly of the longitudinal axis of the hub 74. The radial bore 94 is located along the longitudinal axis of the hub 74. The radial bore 94 extends completely through the hub 74 such that the radial bore 94 communicates with the longitudinal bore 88. The radial bore 94 has an inner ramp face 96 and a second inner face 98 substantially parallel to the inner ramp face 96. The width of the radial bore 94 is sufficient to allow the detent ball 78 to move into and out of the radial bore 94. A person skilled in the art would realize that additional faces may be used to form the walls for the radial bore 94 and that the faces may have varying angular orientations. The inner ramp face 96 may alternatively be provided as a circumferential recess within the hub 74.

A longitudinal face 99 on the handle 72 into which automatic tool-bit holder 70 is inserted prevents the detent ball 78 from completely falling radially out of the tool-bit holder 70 (the longitudinal face 99 of the handle 72 provides a cover over the radial outward end of the radial bore 94 in the hub 74). Preferably, an inner face of the handle 72 or an outer face of the hub 74 (or both) is knurled to create a secure fit between the handle 72 and the tool-bit holder 70. Alternatively, the handle 72 and the hub 74 are keyed or held together for coupled rotation by a detent ball mechanism or other suitable connecting means. In applications where the tool-bit holder 70 is not inserted into a handle, a plug or external sleeve (not shown) covers the radial bore 94 of the hub 74 (to define the longitudinal face 99) in order to prevent the detent ball 78 from falling radially out of the tool-bit holder 70.

A tool-bit used in the embodiment may take the same form as the previously described tool-bit. Typically, the tool-bit 92 includes a hexagonally-shaped shank 100. The shank 100 includes a circumferential groove 102 near the rear end of the shank 100. The circumferential groove 102 includes three distinct surface profiles, including a radially inwardly extending rear radiused shoulder 104, a centered flat portion 106 and a radially inwardly extending forward radiused shoulder 108. The shank 100 has a rear face 110. When the shank 100 is completely admitted into the hub 74, the rear face 110 of the shank 100 rests against the terminating face 90 of the longitudinal bore 88.

The sleeve 76 is slidably mounted along the hub 74 and disposed annularly within the longitudinal bore 88 of the hub 74. Preferably, the sleeve 76 is keyed to the hub 74 to prevent relative rotation between the hub 74 and the sleeve 76. The sleeve 76 has a radial bore 112 in communication with the radial bore 94 of the hub 74. The sleeve 76 has a distal portion 116 that extends beyond the open end 89 of the longitudinal bore 88. The distal portion 116 has a radially extending flange 114. Preferably, the flange 114 extends approximately 90° perpendicular and outward from a distal portion 116 of the sleeve 76. The flange 114 engages the forward face 86 of the hub 74 while in the loading and retracting positions. A person skilled in the art would realize the while an annular flange would suffice for this purpose, the flange 114 is optional and may vary in size and configuration for preferred operator finger contact area, such as one or more radially projecting tabs.

Figure 8:
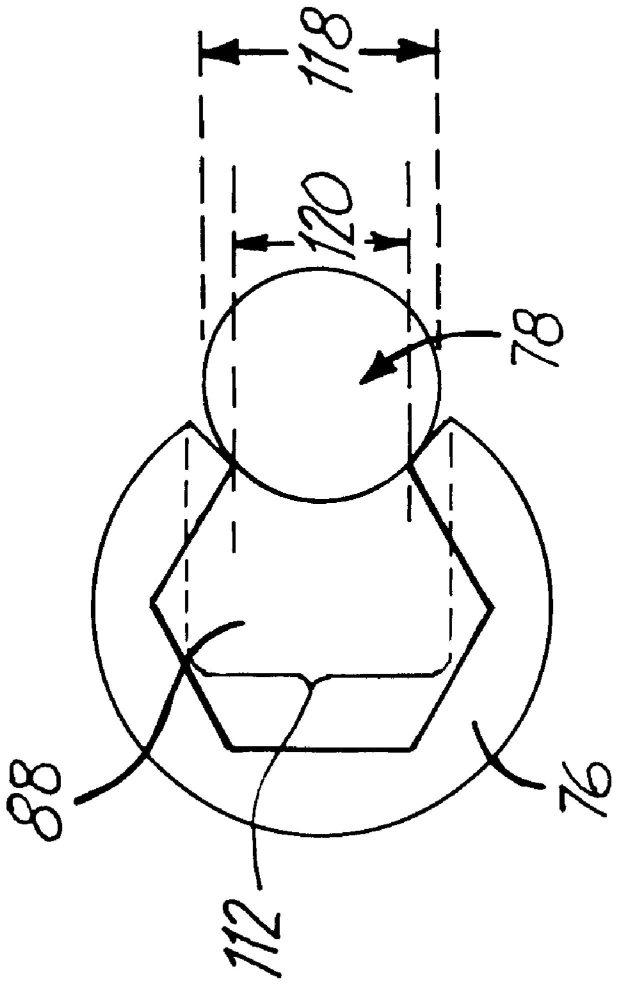
FIG. 8 is a sectional as taken along lines 8—8 in FIG. 7 showing only the hub and detent ball of the tool-bit holder of the second embodiment.
Figure 9:
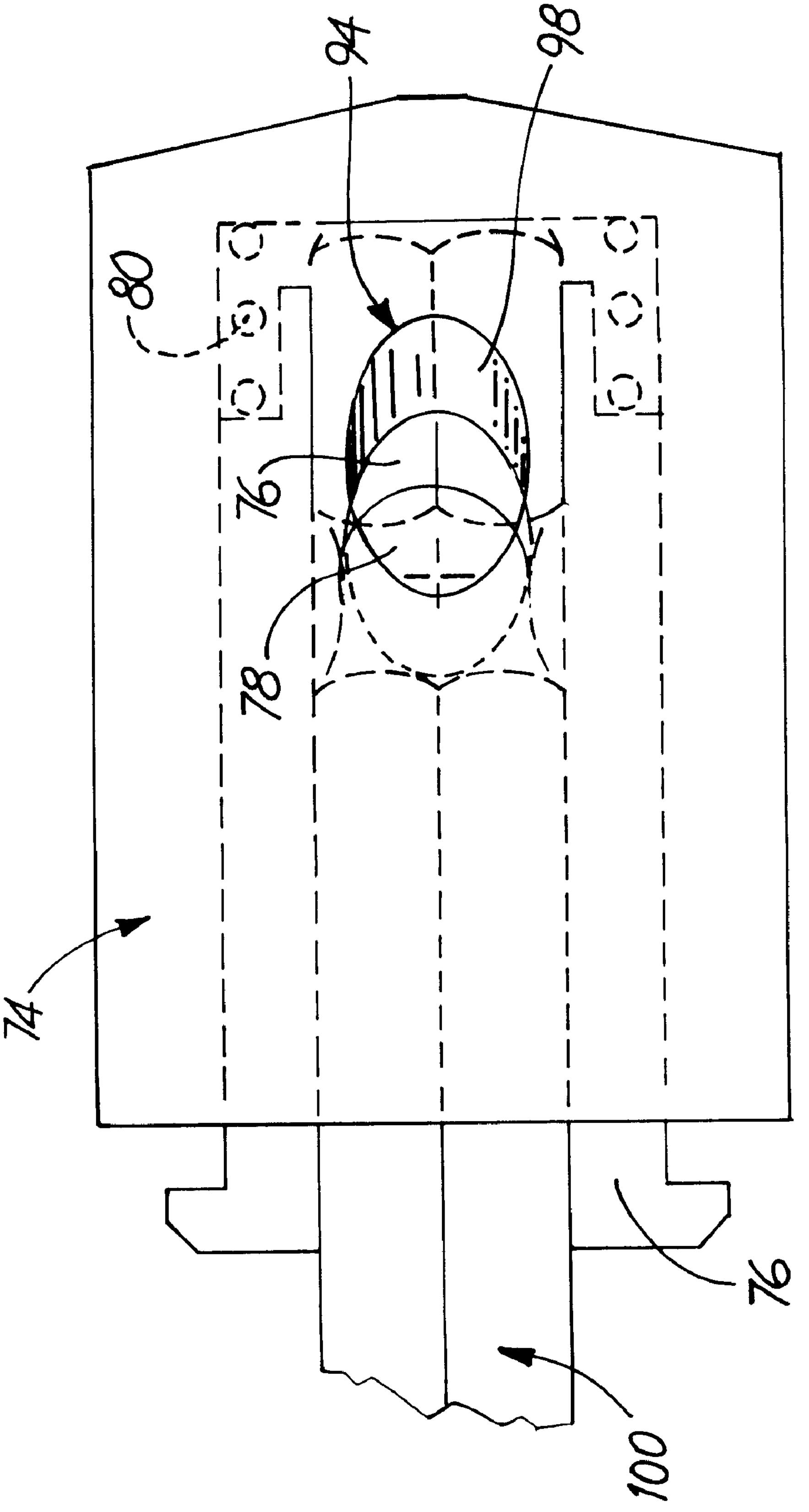
FIG. 9 is a plan view of a hub of the tool-bit holder of the second embodiment, as seen along the plane defined by lines 9—9 in FIG. 7.

The detent ball 78 is disposed in the radial bore 112 of the sleeve 76 and the radial bore 94 of the hub 74. The longitudinal face 99 on the handle 72 prevents the detent ball 78 from leaving its position within the radial bore 94 and completely falling radially out of the tool-bit holder 70. As can be seen by FIG. 8, the diameter 118 of the detent ball 78 is greater than the width 120 of the radial bore 112 of the sleeve 76 (at its radially inner end), thereby preventing the detent ball 78 from completely falling radially into the longitudinal bore 88. FIG. 9 illustrates the location of the detent ball 78 as it rides in the sleeve 76 along the hub 74 relative to the radial bore 94.

The spring 80 is disposed between the terminating face 90 of the longitudinal bore 88 and a radial surface 122 of the sleeve 76. Preferably, the spring 80 engages to the radial surface 122 and extends within a channel 124 of the sleeve 76. The spring 80 is of the compression spring-type, such that the spring 80 urges the sleeve 76 axially toward the open end 89 of the longitudinal bore 88. When the sleeve 76 is urged towards the open end 89 of the longitudinal bore 88, the detent ball 78 in the radial bore 112 of sleeve 76 opposes the bias of the spring 80 and engages the inner ramp face 96. The inner ramp face 96 extends radially outwardly and toward the terminating face 90 of the longitudinal bore 88. The sleeve 76 is slidably positionable along the hub 74 between a locking position and a retracting position (or a tool-bit loading position and unloading position). When the sleeve 76 is in the locking position (FIG. 11), the spring 80 is less compressed than when the sleeve 76 is in the retracting position (FIG. 12), and when the sleeve 76 is in the loading position (FIG. 10), the spring 80 is more compressed than when the sleeve 76 is in the unloading position (FIG. 7).

Figure 7:
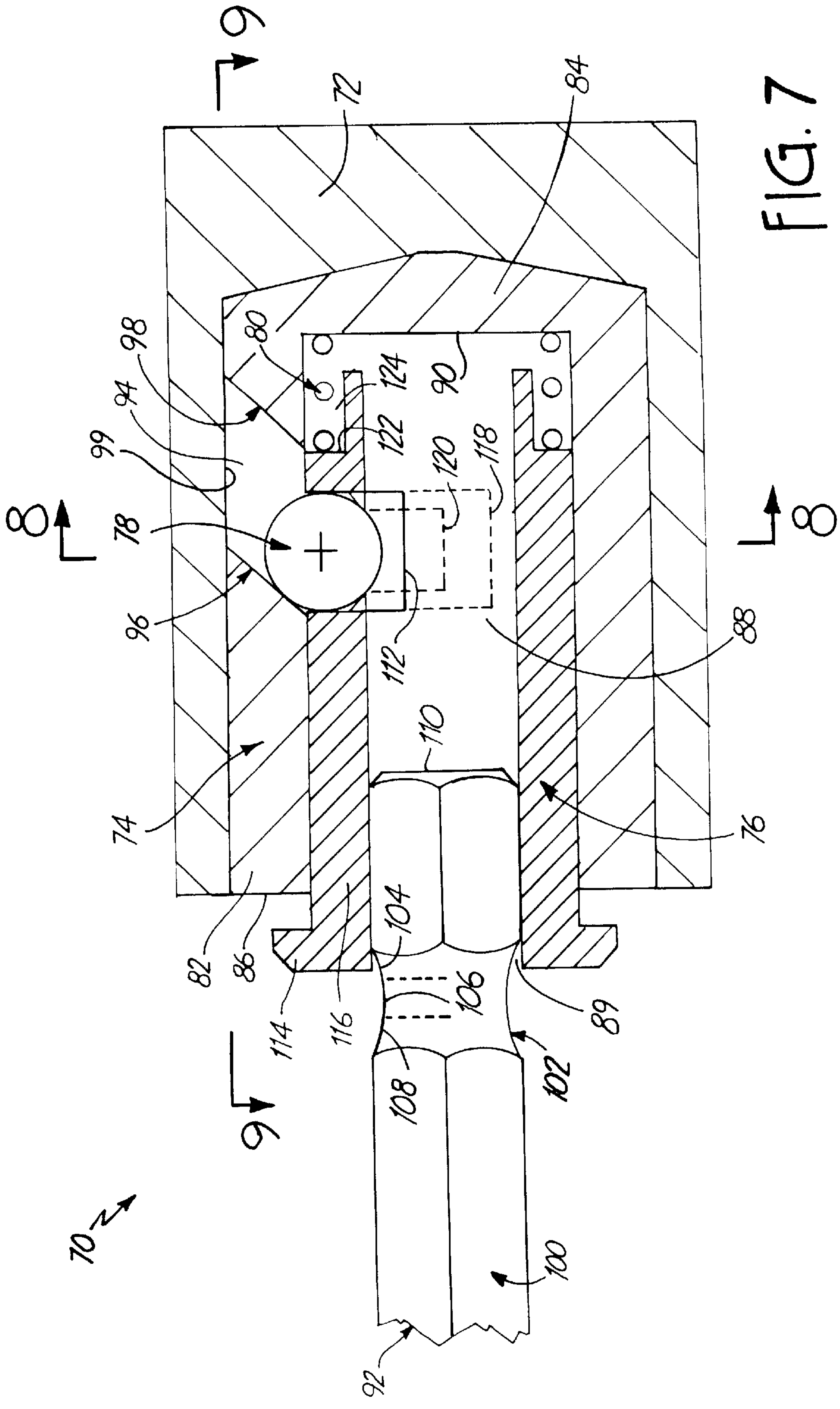
FIG. 7 is a sectional view of a tool-bit shank prior to full insertion into a second embodiment of an automatic tool-bit holder of the present invention, the tool-bit holder is in an unloading position.
Figure 10:
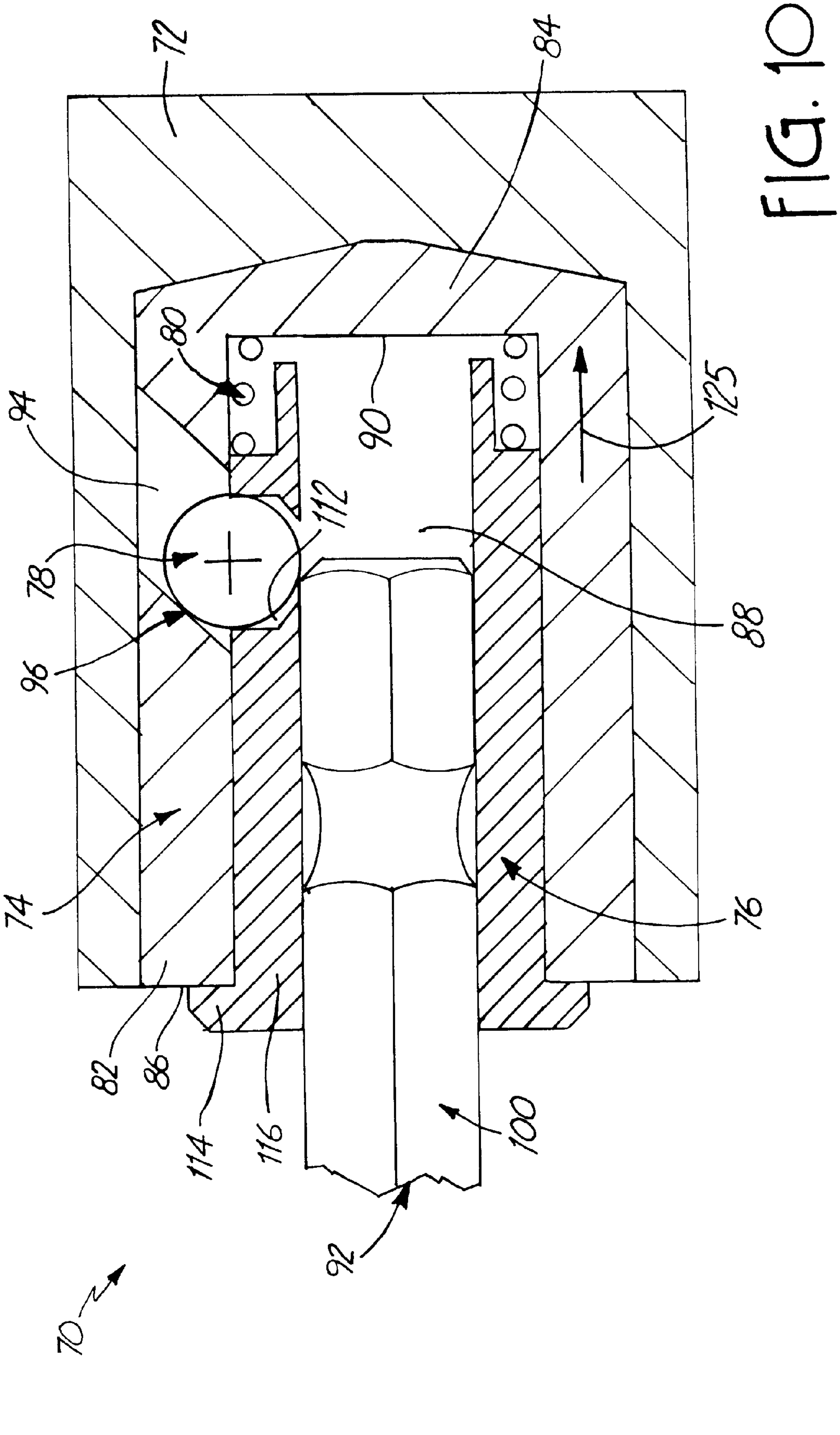
FIG. 10 is a sectional view of the tool-bit shank being inserted or released from the second embodiment of the tool-bit holder, with the tool-bit holder in a loading position.

FIG. 7 illustrates a sectional view of the tool-bit holder 70 while it is in the unloading position prior to full insertion of the shank 100 into the longitudinal bore 88. The tool-bit holder 70 stays in the unloading position until the shank 100 comes in contact with the detent ball 78 as it enters the longitudinal bore 88 (as shown in FIG. 10). While the tool-bit holder 70 is in the unloading position, the spring 80 urges the sleeve 76 axially forward towards the distal end 82 of the hub 74. The detent ball 78 rides in the radial bores 96, 112 along with the sleeve 76 as it moves axially forward. The detent ball 78 is urged radially inwardly along the inner ramp face 96 until the inner ramp face 96 stops the detent ball 78 and prevents the sleeve 76 from further axial forward movement along the hub 74. The detent ball 78 is prevented from completely falling radially into the longitudinal bore 88 by the radial bore 94 of the hub 74 (as can be seen in FIG. 8) because the diameter 118 of the detent ball 78 is greater than the width 120 of the radial bore 94 (at its radially inner end).

FIG. 10 illustrates a sectional view of the tool-bit holder 70 in the loading position as the shank 100 of the tool-bit 92 is directed through the longitudinal bore 88 toward the terminating face 90. The shank 100 comes in contact with the detent ball 78 urging the detent ball 78 out of the longitudinal bore 88 and forcing the sleeve 76 to slide axially rearward (in direction of arrow 125) toward the proximal end 84 of the hub 74 (sleeve 76 will move axially rearward until the detent ball 78 retreats radially outwardly into the radial bore 94 far enough to clear shank 100). The detent ball 78 rides in the radial bore 112 of the sleeve 76 along the shank 100, and as the sleeve 76 slides rearwardly, shank 100 urges the detent ball 78 radially outwardly against the inner ramp face 96 of the hub 74. The spring 80 compresses as the sleeve 76 slides axially rearward toward the proximal end 84 of the hub 74.

Figure 11:
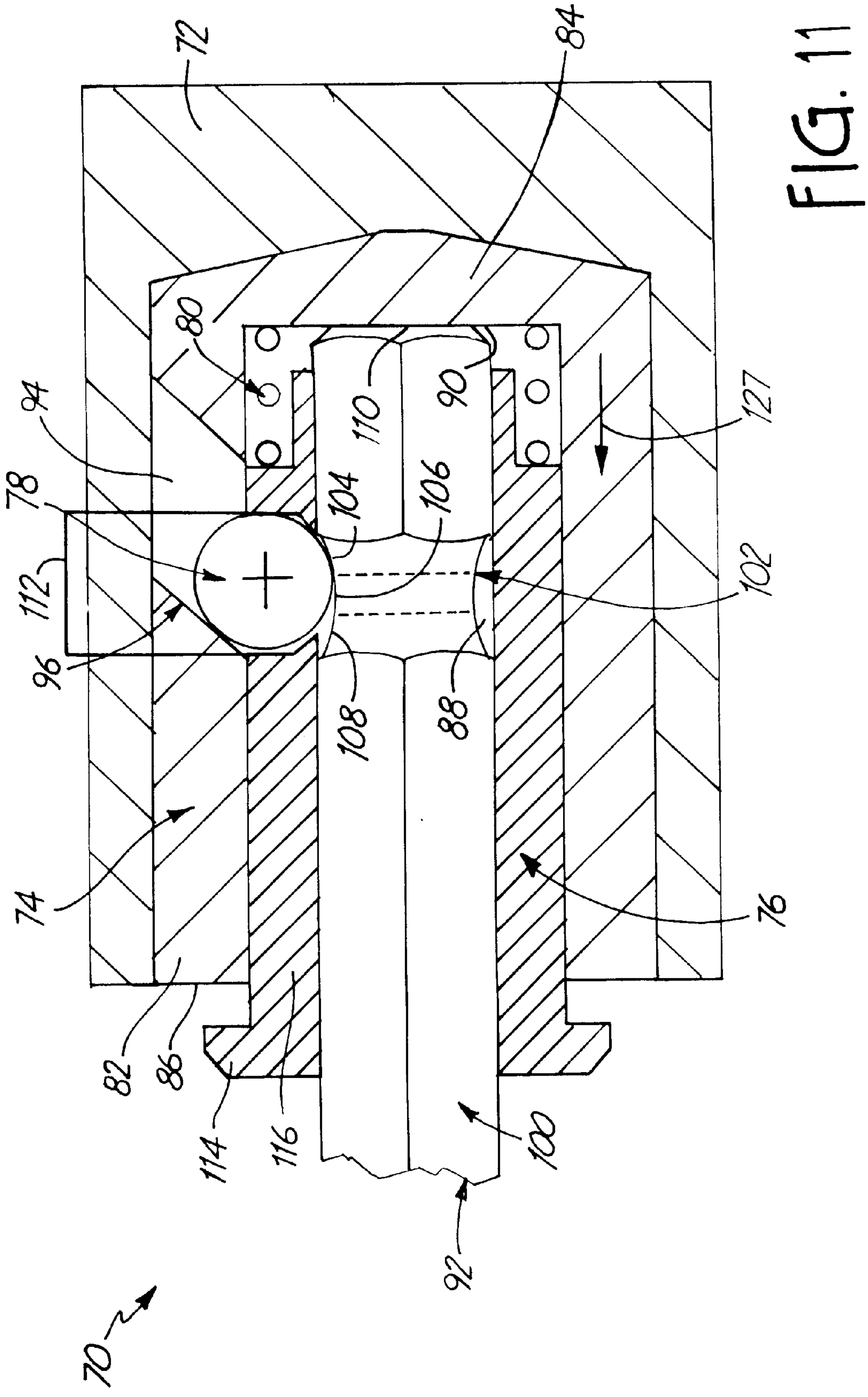
FIG. 11 is a sectional view of the tool-bit shank being captured by the tool-bit holder of the second embodiment, with the tool-bit holder in a locking position.

FIG. 11 shows a sectional view of the tool-bit holder 70 in the locking position. As the shank 100 of the tool-bit 92 moves into the longitudinal bore 88, the circumferential groove 102 of the shank 100 is axially aligned with the radial bore 94 of the hub 74 and the detent ball 78. The shank 100 stops its movement into the longitudinal bore 88 when the rear face 110 of the shank 100 contacts the terminating face 90 of the longitudinal bore 88. When the circumferential groove 102 is axially aligned with the detent ball 78, the spring 80 urges the sleeve 76 axially forward (in direction of arrow 127) along the hub 74 toward the distal end 82 of the hub 74. The axially forward movement of the sleeve 76 forces the detent ball (riding in the radial bore 112 of the sleeve 76) radially inwardly along the inner ramp face 96 of the hub 74 (in direction of arrow 127). The inner ramp face 96 urges the detent ball 78 radially inwardly through the radial bore 112 of sleeve 76 forcing the detent ball 78 to seat in the circumferential groove 102 of the shank 100. The detent ball 78 sits substantially on the radially inwardly extending rear radiused shoulder 104 of the circumferential groove 102. The spring 80 continues to urge the sleeve 76 axially forward toward the distal end 82 of the hub 74. The detent ball 78 riding in the radial bore 112 of the sleeve 76 is stopped by inner ramp face 96 of the hub 74 such that the sleeve 76 is prevented from further axially forward movement along the hub 74.

In the locking position, the tool-bit 92 is locked into the tool-bit holder 70 and cannot be pulled from the tool-bit holder 70. When an attempt is made to remove the tool-bit 92 from the hub 74 by pulling the shank 100 along the longitudinal axis towards the distal end 82 of the hub 74, the rear radiused shoulder 104 of the circumferential groove 102 forces the detent ball 78 against the inner ramp face 96 of the hub 74. The inner ramp face 96 prevents the detent ball 78 from moving radially outwardly from the circumferential groove 102 and thereby prevents the shank 100 from being removed from the longitudinal bore 88.

Figure 12:
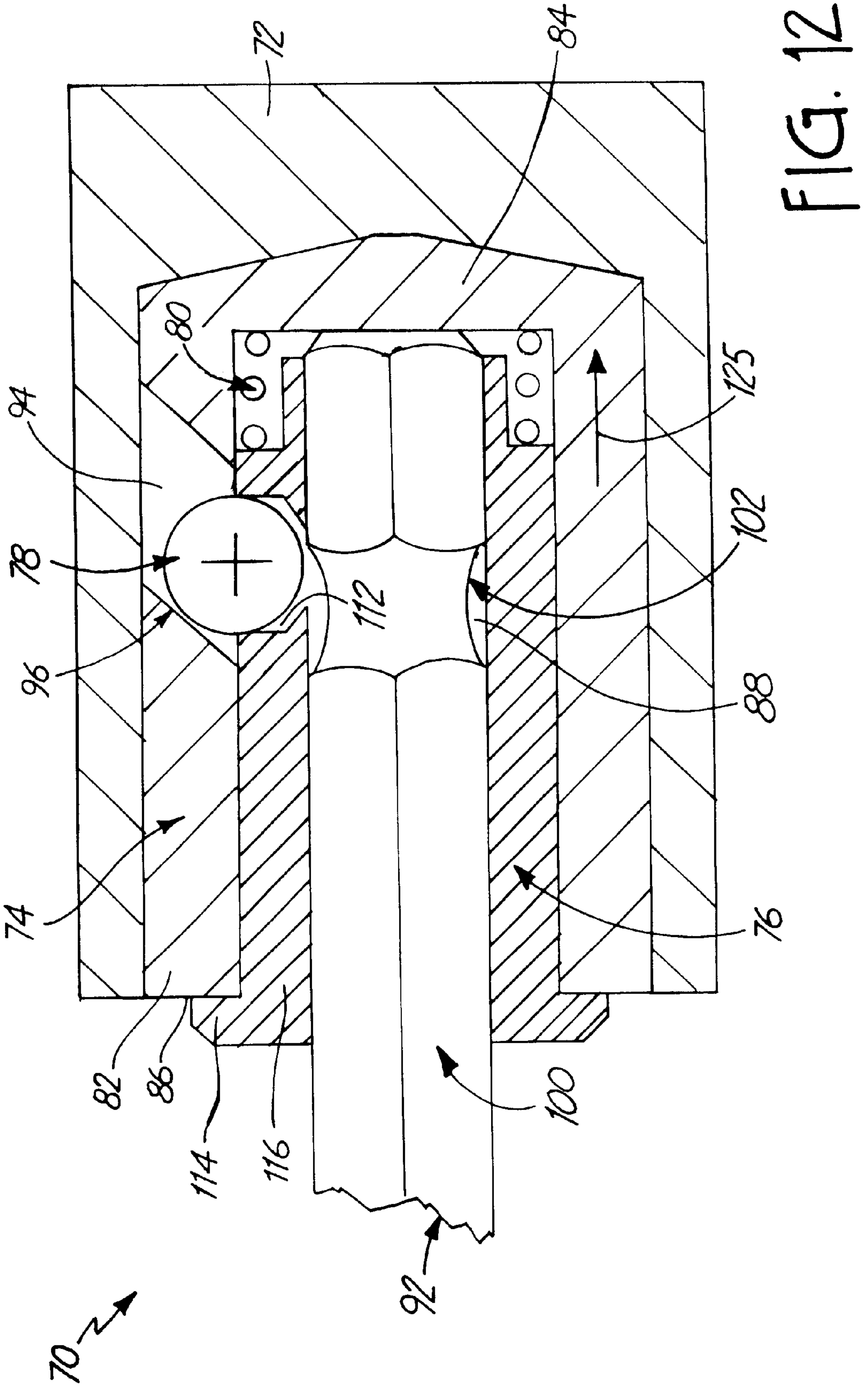
FIG. 12 is a sectional view of the tool-bit shank being released from the tool-bit holder of the second embodiment, with the tool-bit holder in a retracting position.

FIG. 12 shows a sectional view of the tool-bit holder 70 with the sleeve 76 in the retracting position, thereby allowing the removal of the tool-bit 92 from the longitudinal bore 88. The sleeve 76 is moved axially rearwardly (in direction of arrow 125) along the hub 74 toward the proximal end 84 of the hub 74 and against the bias force of the spring 80, thereby compressing the spring 80. Movement of the sleeve 76 is generally performed by the tool operator by pushing on the flange 114 of the distal portion 116 of the sleeve 76 towards the proximal end 84 of the hub 74. As the sleeve 76 is moved axially rearwardly along the hub 74, the detent ball 78 is urged radially outwardly along the inner ramp face 96, thereby removing the detent ball 78 from its seat in the circumferential groove 102. Once the detent ball 78 is removed from the circumferential groove 102, the shank 100 of the tool-bit 92 is free to be released from the longitudinal bore 88. The tool-bit 92 is removed by pulling the shank 100 along the longitudinal axis toward the distal end 82 of the hub 74, thereby releasing the tool-bit 92 from the tool-bit holder 70.

Preferably, the components in both embodiments are formed of a metal material such as steel or aluminum. However, the parts of the automatic tool-bit holder may be formed of other materials, such as polymeric or polymeric composites, ceramics or ceramic composites.

Although the present invention has been described with reference to preferred embodiments, workers skilled in the art will recognize that changes may be made in form and detail without departing from the spirit and scope of the invention. For example, an elastomeric body may provide the bias force instead of a spring. In addition, the spring may be a leaf spring or a washer rather than a coil spring as shown in the FIGS. Also, the cross-sectional shape of the longitudinal bore may be square, triangular, other polygonal shapes that fit tool-bits having various cross-sectional shapes. Further, the longitudinal bore may have various polygonal cross-sectional shapes to prevent relative rotation between the tool-bit and the longitudinal bore.

What is claimed is:

1. In a tool-bit holder of the type which has a hub, a detent ball, a sleeve and a spring wherein the hub has a longitudinal bore formed for axially receiving a tool-bit shank therein, the longitudinal bore has an open end and a terminating face, and the hub has a radial bore therethrough, the detent ball being radially movably disposed in the radial bore of the hub for selected engagement with a circumferential groove on the tool-bit shank, the sleeve being axially slidably mounted relative to the hub for engaging the detent ball, and the spring biasing the sleeve into engagement with the detent ball, the improvement which comprises:

the sleeve having a radial bore in communication with the radial bore of the hub for reception of the detent ball therein;

longitudinally extending inner face fixed relative to the hub, the inner face defining a ramp surface for engaging the detent ball which is opposed to the bias of the spring, the ramp surface extending radially outwardly and toward the terminating face of the longitudinal bore; and an outer member attached to an outer surface of the hub for preventing the detent ball from radial outward movement beyond the radial bores.

2. The improvement of claim 1 wherein the outer member comprises a collar fixedly attached to the hub and disposed annularly about the hub, the collar having a proximal end which forms a channel over the radial bore.

3. The improvement of claim 1 wherein the outer member comprises a tool handle fixed about the hub, the tool handle having a portion which includes a longitudinal face to prevent radial outward movement of the detent ball beyond the radial bores.

4. The improvement of claim 1 wherein the sleeve is slidably disposed within the longitudinal bore of the hub.

5. The improvement of claim 4 wherein the spring is disposed between the terminating face of the longitudinal bore and a radial surface of the sleeve.

6. The improvement of claim 4 wherein a distal portion of the sleeve extends beyond the open end of the longitudinal bore.

7. The improvement of claim 6 wherein the distal portion of the sleeve has a radially extending flange thereon.

8. The improvement of claim 1 wherein the sleeve is slidably disposed around at least a portion of the hub.

9. A tool-bit holder for a tool-bit shank which has a circumferential groove disposed thereabout, the tool-bit holder comprising:

a hub having a longitudinal bore adapted for receiving a tool-bit shank, the longitudinal bore having an open end and a terminating face, and the hub having a radial bore communicating with the longitudinal bore;

a collar fixedly attached to the hub adjacent the open end of the longitudinal bore and disposed annularly about the hub wherein a proximal end of the collar forms a channel over the radial bore;

a sleeve axially slidably mounted along the hub and disposed annularly about the hub wherein the sleeve is partially within the channel and has a radial bore in communication with the radial bore of the hub;

a detent ball disposed in the radial bore of the sleeve, the channel of the collar, and the radial bore of the hub;

at least one inner ramp face on the proximal end of the collar for engaging the detent ball wherein the inner ramp face extends radially outwardly and toward the terminating face of the longitudinal bore; and a spring biasing the sleeve towards the open end of the longitudinal bore wherein the detent ball in the radial bore of the sleeve engages the inner ramp face and the sleeve is slidably positionable along the hub between a locking position and a retracting position.

10. The tool-bit holder of claim 9, and further comprising:

at least one longitudinal face on the proximal end of the collar and aligned to prevent the detent ball from radial outward movement beyond the radial bores.

11. The tool-bit holder of claim 9 wherein when the sleeve is in the locking position the inner ramp face urges the detent ball radially inwardly through the radial bore of the hub and against the bias of the spring such that the detent ball sits in the circumferential groove of the tool-bit shank.

12. The tool-bit holder of claim 9 wherein when the sleeve is in the retracting position the sleeve urges the detent ball radially outwardly against the inner ramp face towards the bias of the spring and out of the circumferential groove of the tool-bit shank.

13. A tool-bit holder for a tool-bit shank which has a circumferential groove disposed thereabout, the tool-bit holder comprising:

a hub having a longitudinal bore adapted for receiving a tool-bit shank, the longitudinal bore having an open end and a terminating face, and the hub having a radial bore communicating with the longitudinal bore;

a sleeve axially slidably mounted along the hub and disposed annularly within the longitudinal bore wherein the sleeve has a radial bore in communication with the radial bore of the hub and a distal portion of the sleeve extends beyond the open end of the longitudinal bore;

a detent ball disposed in the radial bore of the sleeve and the radial bore of the hub;

at least one inner ramp face in the radial bore of the hub for engaging the detent ball wherein the inner ramp face extends radially outwardly and toward the terminating face of the longitudinal bore;

a spring biasing the sleeve towards the open end of the longitudinal bore wherein the detent ball in the radial bore of the sleeve engages the inner ramp face of the hub and the sleeve is slidably positionable along the hub between a locking position and a retracting position; and tool handle for holding the hub wherein a portion of the handle comprises a longitudinal face to prevent the detent ball from radial outward movement beyond the radial bores.

14. The tool-bit holder of claim 13 wherein when the sleeve is in the locking position the inner ramp face urges the detent ball radially inwardly through the radial bore of the sleeve and against the bias of the spring such that the detent ball sits in the circumferential groove of the tool-bit shank.

15. The tool-bit holder of claim 13 wherein when the sleeve is in the retracting position the sleeve urges the detent ball radially outwardly against the inner ramp face towards the bias of the spring and out of the circumferential groove of the tool-bit shank.

16. The tool-bit holder of claim 13 wherein the spring is disposed between the terminating face of the longitudinal bore and a radial surface of the sleeve.

17. The tool-bit holder of claim 13 wherein the distal portion of the sleeve has a radially extending flange thereon.

18. A tool-bit holder for a tool-bit shank which has a hexagonally shaped outer surface, the tool-bit holder comprising:

a hub having a longitudinal bore adapted for receiving a tool-bit shank, the longitudinal bore having an open end and a terminating face, and the hub having a radial bore communicating with the longitudinal bore;

a collar fixedly attached to the hub adjacent the open end of the longitudinal bore and disposed annularly about the hub wherein a proximal end of the collar forms a channel over the radial bore;

a sleeve axially slidably mounted along the hub and disposed annularly about the hub wherein the sleeve is partially within the channel and has a radial bore in communication with the radial bore of the hub;

a detent ball disposed in the radial bore of the sleeve, the channel of the collar, and the radial bore of the hub;

at least one inner ramp face on the proximal end of the collar for engaging the detent ball wherein the inner ramp face extends radially outwardly and toward the terminating face of the longitudinal bore; and a spring biasing the sleeve towards the open end of the longitudinal bore wherein the detent ball in the radial bore of the sleeve engages the inner ramp face and the sleeve is slidably positionable along the hub between a locking position and a retracting position.

19. The tool-bit holder of claim 18, and further comprising:

at least one longitudinal face on the proximal end of the collar and aligned to prevent the detent ball from radial outward movement beyond the radial bores.

20. The tool-bit holder of claim 18 wherein the tool-bit shank includes a circumferential groove disposed thereabout and when the sleeve is in the locking position the inner ramp face urges the detent ball radially inwardly through the radial bore of the hub and against the bias of the spring such that the detent ball sits in the circumferential groove of the tool-bit shank.

21. The tool-bit holder of claim 18 wherein the tool-bit shank includes a circumferential groove thereabout and when the sleeve is in the retracting position the sleeve urges the detent ball radially outwardly against the inner ramp face towards the bias of the spring and out of the circumferential groove of the tool-bit shank.

22. A tool-bit holder for a tool-bit shank which has a hexagonally shaped outer surface, the tool-bit holder comprising:

a hub having a longitudinal bore adapted for receiving a tool-bit shank, the longitudinal bore having an open end and a terminating face, and the hub having a radial bore communicating with the longitudinal bore;

a sleeve axially slidably mounted along the hub and disposed annularly within the longitudinal bore wherein the sleeve has a radial bore in communication with the radial bore of the hub and a distal portion of the sleeve extends beyond the open end of the longitudinal bore;

a detent ball disposed in the radial bore of the sleeve and the radial bore of the hub;

at least one inner ramp face in the radial bore of the hub for engaging the detent ball wherein the inner ramp face extends radially outwardly and toward the terminating face of the longitudinal bore;

a spring biasing the sleeve towards the open end of the longitudinal bore wherein the detent ball in the radial bore of the sleeve engages the inner ramp face of the hub and the sleeve is slidably positionable along the hub between a locking position and a retracting position; and tool handle for holding the hub wherein a portion of the handle comprises a longitudinal face to prevent the detent ball from radial outward movement beyond the radial bores.

23. The tool-bit holder of claim 22 wherein the tool-bit shank has a circumferential groove thereabout and when the sleeve is in the locking position the inner ramp face urges the detent ball radially inwardly through the radial bore of the sleeve and against the bias of the spring such that the detent ball sits in the circumferential groove of the tool-bit shank.

24. The tool-bit holder of claim 22 wherein the tool-bit shank has a circumferential groove thereabout and when the sleeve is in the retracting position the sleeve urges the detent ball radially outwardly against the inner ramp face towards the bias of the spring and out of the circumferential groove of the tool-bit shank.

* * * * *

UNITED STATES PATENT AND TRADEMARK OFFICE
CERTIFICATE OF CORRECTION

PATENT NO. : 6,561,523 B1
DATED : May 13, 2003
INVENTOR(S) : James L. Wienhold

It is certified that error appears in the above-identified patent and that said Letters Patent is hereby corrected as shown below:

Column 2,
Line 28, delete "hub or", and insert -- hub for --

Column 4,
Line 33, delete "channel" and insert -- channel 50 --

Column 6,
Line 31, delete "hub, 74" and insert -- hub 74 --

Column 9,
Line 57, insert -- a -- before "longitudinally"

Column 11,
Line 19, insert -- a -- before "tool"

Column 12,
Line 46, insert -- a -- before "tool"

Signed and Sealed this

Twenty-first Day of October, 2003

JAMES E. ROGAN
*Director of the United States Patent and Trademark Office*